(12) United States Patent
Kunz et al.

(10) Patent No.: US 11,361,048 B2
(45) Date of Patent: Jun. 14, 2022

(54) CONDITIONAL INTERPRETATION OF A SINGLE STYLE DEFINITION IDENTIFIER ON A RESOURCE

(71) Applicant: Google LLC, Mountain View, CA (US)

(72) Inventors: William Kunz, Mountain View, CA (US); Andrew Gildfind, London (GB); Faris Zerdoudi, London (GB); Kerstin Kuehne, London (GB)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/665,945

(22) Filed: Oct. 28, 2019

(65) Prior Publication Data

US 2020/0364276 A1 Nov. 19, 2020

Related U.S. Application Data

(63) Continuation of application No. PCT/CN2019/032910, filed on May 17, 2019.

(51) Int. Cl.
*G06F 16/958* (2019.01)
*G06F 16/957* (2019.01)
*G06F 40/109* (2020.01)
*G06F 40/106* (2020.01)

(52) U.S. Cl.
CPC ........ *G06F 16/958* (2019.01); *G06F 16/9577* (2019.01); *G06F 40/106* (2020.01); *G06F 40/109* (2020.01)

(58) Field of Classification Search
CPC .................................................. G06F 16/958
See application file for complete search history.

(56) References Cited

U.S. PATENT DOCUMENTS

| | | | |
|---|---|---|---|
| 6,023,714 A | 2/2000 | Hill et al. | |
| 10,050,849 B1* | 8/2018 | Long et al. | H04L 43/04 |
| 2004/0260767 A1 | 12/2004 | Kedem et al. | |
| 2008/0082911 A1 | 4/2008 | Sorotokin et al. | |
| 2009/0024917 A1* | 1/2009 | Giannetti | G06F 17/00 |

(Continued)

OTHER PUBLICATIONS

PCT International Search Report and Written Opinion in International Application No. PCT/US2019/032910, dated Jan. 23, 2020, 13 pages.

(Continued)

*Primary Examiner* — James J Debrow
(74) *Attorney, Agent, or Firm* — Fish & Richardson P.C.

(57) ABSTRACT

Methods, systems, and computer programs encoded on a computer storage medium, that relate to conditionally interpreting a single style definition within a same page. Methods include receiving a request to present third party content in a third party content block on a publisher-provided content page. A single style identifier and one or more attributes are obtained from the content page. Subsequently, a third party content item is selected from a content source. Using the single style identifier and the one or more attributes, a first rule is identified that specifies a set of style parameters for content selected for presentation in the third party content block from among a plurality of rules specifying different styles for a respective plurality of third party content blocks. The third party content item is formatted according to the style parameters of the first rule and provided for presentation with the third party content block.

24 Claims, 5 Drawing Sheets

(56) References Cited

U.S. PATENT DOCUMENTS

2014/0201623 A1\* 7/2014 Kattner et al. ........ G06F 17/218
2014/0229821 A1\* 8/2014 Abrahami ........... G06F 17/2247
2016/0070813 A1\* 3/2016 Unter Ecker et al. .. G06F 17/30

OTHER PUBLICATIONS

International Preliminary Report on Patentability in International Appln. No. PCT/US2019/032910, dated Nov. 16, 2021, 7 pages.
Office Action in Japanese Appln. No. 2020-539776, dated Nov. 1, 2021, 8 pages (with English translation).

\* cited by examiner

CONDITIONAL INTERPRETATION OF A SINGLE STYLE DEFINITION IDENTIFIER ON A RESOURCE

CROSS-REFERENCE TO RELATED APPLICATIONS

This application is a continuation application of, and claims priority to, PCT Patent Application No. PCT/US2019/032910, titled "CONDITIONAL INTERPRETATION OF A SINGLE STYLE DEFINITION IDENTIFIER ON A RESOURCE," filed on May 17, 2019. The disclosure of the foregoing application is incorporated herein by reference in its entirety for all purposes.

BACKGROUND

This specification relates to data processing and conditionally interpreting a single style definition within the same page.

A user can access content (e.g., news, music, social media) on a content page provided by a publisher (e.g., search engines, social media platforms, news platforms, data aggregator platforms, etc.). The content on the content page may be provided by the publisher or by one or more content sources that store third party content. This third party content is provided for presentation in third party content blocks on the publisher's content page. The publisher can control the type and nature of its own content that is presented on the content page, but it generally cannot control the type and nature of third party content provided for presentation in the third party content blocks. For example, access restrictions can prevent the publisher from modifying the third party content that is presented in the third party content blocks.

SUMMARY

In general, one innovative aspect of the subject matter described in this specification can be embodied in methods that include the operations of receiving a request to present third party content in a third party content block on a content page provided by a publisher, wherein the third party content is provided by an entity different from the publisher; obtaining a single style identifier and one or more attributes from the content page; after receiving the request, selecting a third party content item from a content source that stores third party content; identifying, using the single style identifier and the one or more attributes, a first rule specifying a set of style parameters selected for content selected for presentation in the third party content block from among a plurality of rules specifying different styles for a respective plurality of third party content blocks on the content page; formatting the third party content item according to the set of style parameters specified in the first rule; and providing the third party content item for presentation within the third party content block of the content page. Other embodiments of this aspect include corresponding systems, devices, apparatus, and computer programs configured to perform the actions of the methods. The computer programs (e.g., instructions) can be encoded on computer storage devices. These and other embodiments can each optionally include one or more of the following features.

In some implementations, the one or more attributes can include user agent, browser screen size, third party content block name, or device type.

The methods can include the operations of modifying the set of style parameters specified in the first rule; and wherein formatting the third party content item according to the set of style parameters specified in the first rule, includes formatting the third party content item using the modified set of style parameters specified in the first rule in response to receipt of the single style identifier.

The methods can include the operations of determining an amount of user activity for the third party content item presented within the third party content block; modifying the set of style parameters specified in the first rule in response to the amount of user activity; formatting the third party content item using the modified set of style parameters specified in the first rule in response to receipt of the single style identifier; and after formatting the third party content item using the modified set of style parameters, providing the third party content item for presentation within the third party content block of the content page.

The methods can include the operations of obtaining, from the content page, one or more sets of style parameters, wherein each set of style parameters specifies a manner in which content is to be formatted for presentation in one or more third party content blocks; for each set of style parameters of the one or more style parameters, generating a rule including the set of style parameters; and storing each generated rule as a rule for the single style identifier along with the plurality of rules.

In some implementations, the set of style parameters specified in the first rule can be selected by the publisher.

In some implementations, the style parameters include at least a maximum number of characters, a font color, a font type, a font size, an orientation, or a border applicable to the third party content.

In some implementations, the third party content block comprises an embeddable display element embedded in the content page.

Particular embodiments of the subject matter described in this specification can be implemented to realize one or more of the following advantages. For example, the innovations described in this specification provide publishers with the ease and flexibility to specify and/or modify styles (e.g., formatting information) for different third party content blocks on the publisher's content page without modifying the content page. Conventionally, a publisher had to write code (e.g., JavaScript® or cascading style sheets) to specify the content styling (i.e., the manner in which the content is to be presented) in third party content blocks of a content page provided by the publisher. If a publisher wanted to change the styles for a third party content block, the publisher would have to rewrite or modify the corresponding code for that block. Using the innovations described in this specification, a publisher can specify, to a content management system, styles for different third party content blocks and/or devices without modifying the code on the page. This content management system uses these styles selected by the publisher to automatically format third party content and then present this formatted content within the appropriate third party content blocks on the content page. If a publisher wants to subsequently modify the styles for one or more third party content blocks, it does not have to rewrite or modify code on the content page, as in the case of conventional solutions. Instead, the innovations described in this specification enable the publishers to modify the style information maintained by a content management system. This in turn causes the content management system to subsequently format and present content within the appropriate third party content blocks using the modified style information.

The innovations described in this specification also enable operators of the publisher's content page with little or no coding knowledge to modify style information for the third party content blocks on the content page. As described in this specification, the content management system stores the different types of style parameters (e.g., font size, color, border, orientations, etc.) and provide a front-end interface with user entry fields (e.g., text boxes, drop down menus, check boxes, etc.) where the operator can specify or select the desired values for these different style parameters. Using the operator's selections, the content management system can generate the appropriate code to format the third party content item and present this formatted content item within an appropriate third party content block on the content page.

The innovations described in this specification further enable using a single style identifier to specify multiple different styling rules for different content blocks and/or devices. Prior art solutions that include a single style identifier within the content page only associate this style identifier with a single set of style parameters. As a result, these prior art solutions generate content for presentation in all the content blocks and devices using the same set of style parameters. The innovations described in this specification utilize a single style identifier, but, unlike prior art solutions, this style identifier corresponds to different style parameters for different third party content blocks and devices. This gives publishers the flexibility to provide different styling/formatting for different third party content blocks and across different devices. For example, a single style identifier can be embedded into the content page, and that single style identifier can be dynamically interpreted at each presentation of the content page, so as to determine and/or modify the visual appearance of third party content that is presented on the page depending on the context of that particular presentation of the content page. More specifically, the single style identifier initiates a process by which the context of the presentation of the content page is determined, and used to conditionally select the specific styling that will be used for content presented in each different third party content block that is defined in the content page. This provides a more flexible styling solution relative to traditional systems, and allows the publisher of the content page to modify how third party content appears on the content page without having access to the third party content that will be presented.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
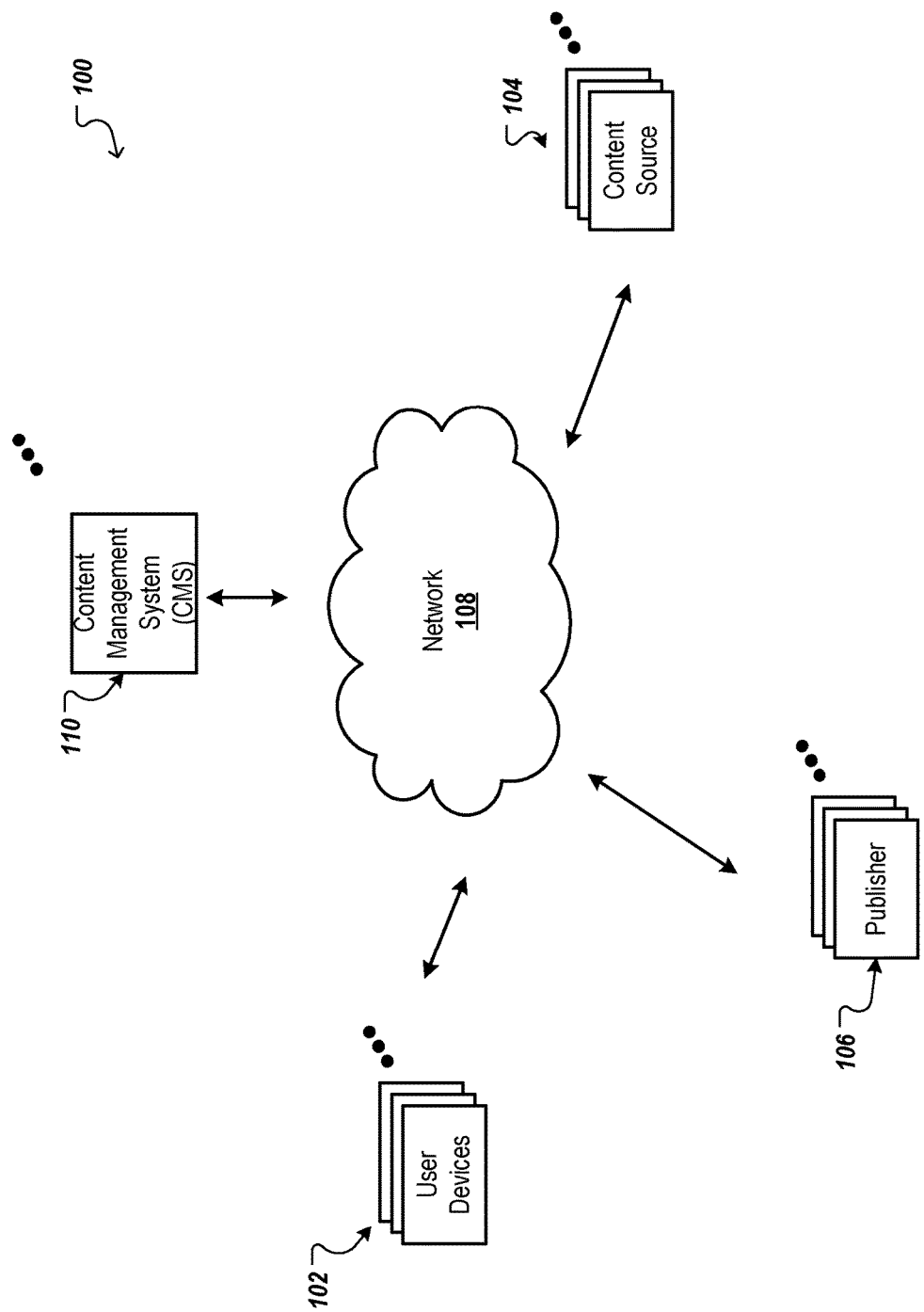
FIG. 1 is a block diagram of an example environment in which content is distributed for presentation.

This specification relates to enhancing systems that enable third party content styling. As discussed in more detail below, different styling (or formatting) can be specified by a publisher of a content page, and applied to third party content that is selected for presentation in different third party content blocks within the content page.

A publisher's content page can include one or more third party content blocks where third party content is presented. These third party content blocks are generally populated at the time the content page is presented to a user, such that each presentation of the content page could potentially include a different combination of third party content. As described further below, and in detail throughout this specification, a publisher can select different style rules for presentation of content in the different third party content blocks. As a result, when a user accesses the publisher's content page, the third party content presented in these third party content blocks is formatted differently depending on the rules specified by the publisher and the context in which the content is presented. As used throughout this document, the context in which content is presented is defined using a variety of attributes including one or more of a type of device that is presenting the content, which third party content block will present the content, a time of day at which the content is being presented, a geographic location of the device that is presenting the content, attributes of a user that is being presented the content, a type of browser that is being used to present the content, or other appropriate attributes.

The context in which content is presented can be determined based on information gathered from a request for third party content. As described in more detail below, when a user accesses the publisher's content page on a user device, a script on the content page executes and generates a request for third party content for the third party content blocks. This script can also collect the style identifier included in the content page as well as one or more attributes (e.g., device type, user agent type, screen size, etc.). The style identifier and the one or more attributes are generally included with the request. The user device transmits this request to a content management system.

Upon receiving the request, the content management system selects one or more third party content items from one or more content sources that store third party content.

The content management system also uses a data structure that stores style rules for a particular content page, to identify the appropriate style rules to format the third content items. In particular, this data structure can include style identifiers associated with different content pages and for each style identifier, the data structure can include one or more style rules selected by a publisher (or provided by default by the content management system) and a corresponding set of style parameters (e.g., font color, font size, orientations, border, etc.). From this data structure, the content management system identifies the style rules corresponding to the style identifier included in the user request. From among these style rules associated with a style identifier, the content management system identifies one or more style rules based on the one or more attributes included in the request received from the user device. For example, the attributes in the user request may include names of the third party content blocks (e.g., Top Block and Bottom Block) that are defined in the content page, and the content management system may use this information to find the style rules that apply to content blocks with the same or similar names (as further described below).

The content management system formats the selected third party content items using the style parameters associated with the identified style rules and then provides these formatted third party content items for presentation on the publisher's content page. In the above example, the content management system may provide an embeddable display element (as further described below) for the Top Block that is formatted using one set of style parameters and a separate embedded display element for the Bottom Block using a separate set of style parameters. As such, the single style identifier that is embedded in the page can be used to apply different types of styles/formatting depending on the third party content blocks that will present the content selected for presentation, rather than requiring a different style definition to be embedded into the content page for each of the different third party content blocks.

These features and additional features are described in more detail below with reference to FIGS. 1-4. For brevity, third party content blocks are also referred to as content blocks.

FIG. 1 is a block diagram of an example environment 100 in which content is distributed for presentation. The example environment 100 includes a network 108, such as a local area network (LAN), a wide area network (WAN), the Internet, or a combination thereof. The network 108 connects user devices 102, content sources 104, publishers 106, and content management systems 110. The example environment 100 may include many different user devices 102, content sources 104, publishers 106, and content management systems 110.

A user device 102 is an electronic device that is capable of requesting and receiving content over the network 108. Example user devices 102 include personal computers, mobile communication devices, digital assistant devices, and other devices that can send and receive data over the network 108. A user device 102 typically includes a user application, such as a web browser, to facilitate the sending and receiving of data over the network 108, but native applications executed by the user device 102 can also facilitate the sending and receiving of content over the network 108. As used in this specification, content refers to various types of web-based and/or otherwise presented information, such as articles, discussion threads, reports, analyses, financial statements, music, video, graphics, search results, web page listings, information feeds (e.g., RSS feeds), television broadcasts, radio broadcasts, printed publications, etc.

A publisher 106 is a computing platform that distributes content by providing one or more content pages that can be accessed, e.g., by user devices 102, over the network 108. Example publishers 106 include news websites, content websites, social media platforms, data aggregator platforms, or other content sharing platforms. Each publisher 106 can be operated by a content publishing service provider.

The publisher 106 can publish, on its content page(s), its own content. For example, the publisher 106 may be a news platform, which publishes its own news articles. The publisher 106 may also present on its content pages, third party content provided by a content management system (CMS) 110, which in turn obtains this content from one or more content sources 104. As used in this specification, third party content refers to content provided by a third party—i.e., an entity other than the publisher 106.

The CMS 110 is a computing platform that can include one or more backend servers that provides various services to the publishers 106 and content sources 104. The CMS 110 stores, manages, and/or provides both content and other types of materials that are stored on a server and retrieved programmatically. The CMS 110 may make these services available to the publishers 106 and content sources 104 through one or more front-end interfaces. In some examples, the front-end interfaces may be configured as web applications that provide users with access to features provided by the CMS 110.

The CMS 110 selects third party content in response to content requests received from user devices 102. In some implementations, when a user of a user device 102 accesses a content page provided by a publisher 106, a script on the content page may execute that requests third party content from the CMS 110. In some implementations, the user of a user device 102 may request third party content, e.g., using a search box provided by a search engine on the content page of the publisher 106.

Upon receiving the request for third party content from the user device 102, the CMS 110 selects content in response to this request. In some implementations, the CMS 110 identifies relevant third party content based on the content on the content page of the publisher 106. For example, the CMS 110 can receive a URL (uniform resource locator) of the content page, e.g., from the user device 102, and identify indexed content keywords associated with the URL. The CMS 110 can cross-reference the indexed content keywords against a list that includes the content stored in the content sources 104 and the keywords associated with each content item on the list. As another example, the CMS 110 may use content keywords and/or other content in the content page to identify third party content stored by one or more content sources 104. The CMS 110 identifies the content by matching the content keywords in the publisher's 106 content page with the keywords associated with the third party content stored in the list/index maintained by the CMS 110. As yet another example, the third party content request received from the user device 102 may specifically identify the type of third party content, e.g., by providing certain keywords, that the CMS 110 can cross reference against the above-referenced list to identify the appropriate content stored by one or more content sources 104.

Once the CMS 110 identifies the appropriate third party content items, it requests this content from the appropriate content source 104 where these content items are stored. In response, the content source 104 provides one or more third party content items. As depicted in FIG. 1, the CMS 110 is separate from the content sources 104.

Upon receiving these third party content items from the content source 104, the CMS 110 can format each of these content items using one or more sets of style parameters, as further described with reference to FIG. 2.

As depicted in FIG. 1, a content source 104 may be a separate data processing apparatus from the CMS 110 and each may be managed/maintained by different entities. In other implementations, the CMS 110 may include one or more content sources 104, all of which may be managed/maintained by the same entity. In such implementations, when the CMS 110 selects the appropriate third party content items, it retrieves these third party content items from its own content source 104 (instead of having to request content from a separate content source 104 over network 108).

In some implementations, the CMS 110 can identify the third party content and the style parameters that are to be applied to the third party content, and then simply send a response to the user device 102 that conveys this information to the user device 102. For example, the CMS 110 can generate a reply to a content request that includes one or more URLs at which the identified third party content can be obtained and information identifying the style parameters that are to be applied to each third party content. When the user device 102 receives the reply, the user device 102 can initiate a request to obtain the identified third party content from the one or more URLs, and apply the style parameters to the content blocks as instructed. The following description refers to the CMS 110 performing the formatting according to the style parameters, but it should be understood that this formatting could be performed at the user device 102.

Figure 2:
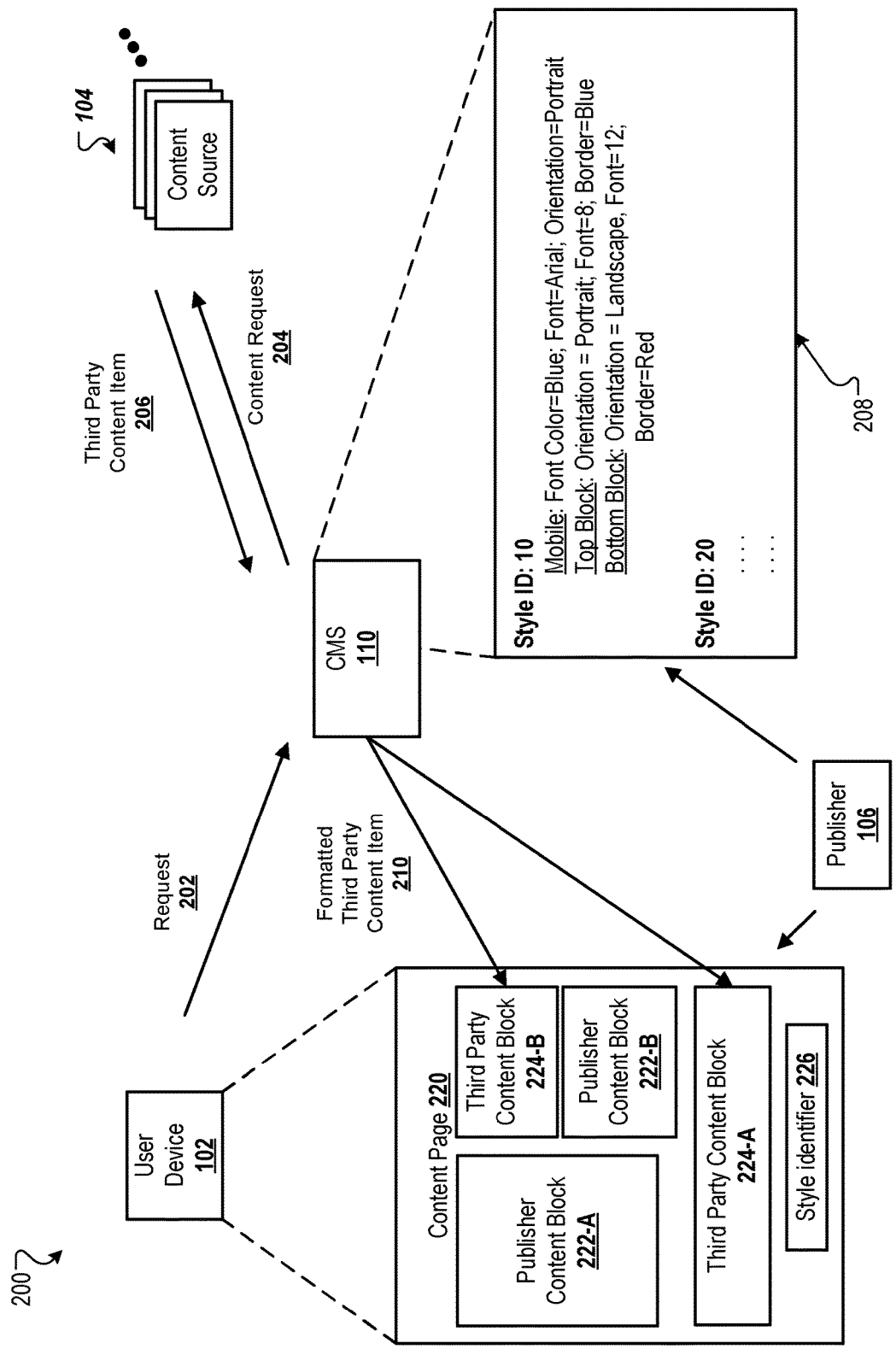
FIG. 2 is a block diagram illustrating the operations performed by the content management system in formatting for third party content items and providing these items for presentation in third party content blocks on a publisher's content page.

FIG. 2 is a block diagram illustrating the operations performed by the content management system 110 in formatting third party content items and providing these items for presentation in third party content blocks on a publisher's content page.

As shown in FIG. 2, a user of user device 102 accesses, over a network 108, a content page 220 provided by a publisher 106. The content page 220 includes content provided by the publisher 106, which is presented in publisher content blocks 222-A and 222-B, as well as third party content, which is presented in third party content blocks 224-A and 224-B.

In some implementations, the content in the third party content blocks 224-A and 224-B can be provided using embeddable display elements, such as an HTML (Hypertext Markup Language) I-Frame (inline frame). As used in this specification, an embeddable display element refers, for example, to any element that can be embedded in a location (e.g., a content page 220 of a publisher 106) that allows third party content from an external source (e.g., content source 104) to be displayed in that location. As described below, the CMS 110 can use embeddable display elements to provide third party content for display along with the publisher's content on the content page 220.

The third party content presented within the third party content blocks 224-A and 224-B can include any type of media, including news, video, audio, advertisements, etc. The content presented in these third party content blocks 224-A and 224-B is provided by a third party (i.e., an entity other than the publisher 106), and the publisher 106 does not have control on the type of content presented in these blocks. However, as described below, the publisher 106 can control the styling/formatting of the third party content within these blocks.

In some implementation, when the user accesses the content page 220 on user device 102, a script on the content page 220 generates a request 202 for third party content for the third party content blocks 224-A and 224-B. The user device 102 sends, and the CMS 110 receives, the request 202.

In some implementations, the script identifies a style identifier 226 and one or more attributes of the content page 220 and/or user device 102, and includes this information with the request 202. In some implementations, the script collects the style identifier 226 included within the content page 220, e.g., in the metadata of the content page 220. In some implementations, the script also identifies one or more attributes (also referred to in this specification as signals) from the content page, the application presenting the content page (e.g., a browser), or from other aspects of the environment (e.g., data collected from the network connection of the request, such as an IP address). As used in this specification, attributes or signals provide information about the user environment and/or the user activity on the application. For example, the script can collect attributes, such as the user agent or application (e.g., browser, native application), the screen size, third party content containers or blocks (e.g., portions of the page that have been identified in the page's structure for presenting the third party content), the type of device (e.g., mobile or desktop), and geolocation information (e.g., IP address, language settings, etc.).

The script includes the style identifier and the identified attributes with the request 202, each of which may be included as separate tags within the request. For example, the style identifier may be included within a "Style ID" tag included in the request, and the third party name may be included within a "Third Party Block" tag included in the request.

In some implementations, upon receiving the request 202, the CMS 110 obtains the style identifier and the one or more attributes included within the request 202. The CMS 110 obtains this information by searching within the request for the tag corresponding to this information, and extracting the information from the request. For example, if the style identifier is included with the request 202 using a "Style ID" tag, the CMS 110 searches for the "Style ID" tag within the request 202 to obtain the corresponding style identifier. Similarly, if the request 202 includes the third party name within a "Third Party Block" tag, the CMS 110 can search for this tag within the request 202 to identify the corresponding third party block name.

Alternatively, in some implementations, the script does not collect or include the style identifier and one or more attributes in the request 202. In such implementations, upon receiving the request 202, the CMS 110 may send another request to the user device 102 to provide the style identifier and the one or more attributes. In response, the same script or another script collects this information (in the same manner described above) and provides it to the CMS 110 in a separate message.

Upon receiving the request 202 (and in some instances, the additional message including the style identifier and the one or more attributes), the CMS 110 selects the appropriate third party content items to provide in response to this request, as described above with reference to FIG. 1. Thus, as described above with reference to FIG. 1, the CMS 110 can identify the appropriate third party content and requests this content by sending one or more content requests 204 to the one or more content sources 104 where the content is stored. In response, these content sources 104 provide the requested third party content items to the CMS 110. Alternatively, and as described above with reference to FIG. 1, the CMS 110 retrieves this content from the one or more content sources 104 that are included within the CMS 110.

In addition to retrieving the appropriate third party content items from the content sources 104, the CMS 110 also identifies a set of style parameters that specify the formatting for each content item, as further described below.

The CMS 110 includes a data structure 208 that stores style identifiers and corresponding rules that include a set of style parameters for different conditions. As shown in data structure 208, the style ID 10 includes three rules: Mobile, Top Block, and Bottom Block. As used in this specification, style identifier or style ID is an identifier present in the content page that is used to identify a set of rules that specify how to format content. The style identifier can be represented using, for example, numbers, alphabets, and/or punctuations. Each rule for a particular style identifier includes a set (e.g., one or more) of style parameters. As used in this specification, a style parameter is a formatting characteristic that describes a particular type of formatting for content on a content page. Examples of style parameters include, among others, size (e.g., maximum number of characters), shape, color, font, borders, and presentation style (e.g., audio, video, graphical, textual, etc.). As shown in data structure 208, each of the rules associated with style ID 10 includes a set of style parameters, such as font color, font type, font size, orientation, and border.

For each style identifier, a publisher 106 can select the rules and the corresponding style parameters using a publisher-specific front end interface of the CMS 110. The content management system stores the different types of style parameters (e.g., font size, font type, font color, border, orientations, etc.) and provide a front-end interface with user entry fields (e.g., text boxes, drop down menus, check boxes, etc.) where the publisher service provider or another operator can specify or select the desired values for these different style parameters. Using the operator's selections, the content management system can generate the appropriate code, e.g., JavaScript®, HTML, JSON, CSS, or other equivalent web or application technologies, to format the third party content item and present this formatted content item within an appropriate third party content block on the content page. Similarly, the content management system 110 can also generate the appropriate code to format the third party content for presentation within applications operating on different desktop and mobile devices, which are different from web technologies.

In some implementations, the rules specified by the publisher operate as conditions for application of one or more sites of style parameters. For example, an operator of the publisher 106 can use the front-end interface to generate a rule that specifies style parameters for formatting content on a mobile device. In this example, any styling parameters that are specified within this rule are only applied when the context of the content presentation (e.g., as specified in the request received from the user device) indicates that the content is going to be presented on a mobile device.

If the condition of a rule is not met, the style parameters of that rule will not be applied. Continuing with the example above, if the request specified that the device type that will present the content is a desktop, rather than a mobile device, the style parameters specified for the mobile device rule would not be applied. However, if the style identifier also had a different set of style parameters that were conditioned on the device type being "desktop," that different set of style parameters would be eligible for formatting the selected third party content.

Within each device type (or other context condition) styling definition, a publisher 106 can also use the front-end interfaces to generate a separate formatting rule for each third party content block of the content page. For example, if a content page includes two content blocks that are identified in the page structure as "Bottom Block" and "Top Block," the publisher can create separate rules for each block. These generated rules can then be stored in the data structure 208 that is maintained by the CMS 110. In this way, the publisher 106 can specify different formatting for each of these content blocks.

In some implementations, each content block can have a different set of style parameters defined for each device type or any other conditional attribute upon which styling of the third party content is conditioned. For example, the "Bottom Block" discussed above could have one set of style parameters defined for use when the device type is "mobile" and a completely different (or partially modified) set of style parameters that are defined for use when the device type is "desktop." Similarly, the style parameters can be defined differently on a per-geographic region basis, a per-time of day basis, a per-user-type basis, or any other contextual basis. In fact, multiple different conditions, such as device type and geographic region, can be used to condition application of a particular set of styling parameters, such that the publisher 106 can create many different sets of conditional styling parameters, which can be applied depending on the context of the content presentation. Furthermore, all of these different conditional styling parameters can be applied using the single style identifier that was included in the page, and the conditional styling parameters can be changed at any time to adjust the formatting of third party content without changing the code of the content page.

In some implementations, the CMS 110 may include its own set of default rules and corresponding style parameters. The publishers 106 can use, modify, add to, and/or delete these rules using the front-end interface of the CMS 110.

As described above, the CMS 110 receives the style identifier and one or more attributes along with the request 202. The CMS 110 uses the style identifier and the one or more attributes to identify the appropriate rules and corresponding style parameters from the data structure 208. The CMS 110 first uses the style identifier to identify the set of rules for a particular content page provided by the publisher 106. For example, if the request 202 included the style ID 10, the CMS 110 searches for this style identifier in the data structure 208. Upon finding a match for the style ID 10 in the data structure 208, the CMS 110 identifies the three rules (Mobile, Top Block, Bottom Block) for this style identifier shown in data structure 208.

From these rules, the CMS 110 identifies one or more rules using the one or more attributes included in the request 202. In some implementations, the CMS 110 identifies a rule by looking for a match between the rule name and one or more attributes. For example, one of the attributes taken from the page structure may be the name of the third party content block, which in this example is Top Block. The CMS 110 searches for and identifies "Top Block" among the identified rules. In some implementations, the CMS 110 can use a single attribute or a combination of attributes to make an inference, which can then be compared to the identified rules. The CMS 110 can include a rules-based engine that can draw these types of inferences using one or more attributes. Alternatively, the CMS 110 can make such inferences using artificial intelligence techniques, such as, e.g., supervised or unsupervised machine learning models that have been trained using a set of inferences for multiple sets of one or more attributes. For example, using either a rules-based or a machine learning techniques, the CMS 110 can determine that a five inch screen that is using a particular browser suggests that the user device 102 is a mobile device. The CMS 110 searches for and identifies "mobile" among the rules for style ID 10 in the data structure 208.

The CMS 110 obtains the set of style parameters associated with each identified rule and uses these style parameters to format the received third party content item. For example, if the identified rule is Bottom Block, the CMS 110 uses the set of style parameters corresponding to this rule (in data structure 208) to format this data. Thus, in this example, the CMS 110 formats the third party content item to be in landscape orientation, with a font of size 12 and a red border for the content block. As discussed above, the CMS 110 can also send instructions to the user device 102 that cause the user device 102 to format the third party content according to the appropriate style parameters.

The CMS 110 then provides this formatted content for presentation in the appropriate third party content block/s 224-A and 224-B of the content page 220. In some implementations, the CMS 110 provides the formatted content to the user device 102 as an embeddable display element. For example, if the CMS 110 formats the received third party content using the style parameters corresponding to the Bottom Block rule (in data structure 208), it then provides the formatted third party content item 210 for presentation as an embeddable display element at the location corresponding to the bottom block on the content page 220.

In some implementations, a publisher 106 can alter the set of style parameters corresponding to an existing rule. For example, for the Top Block rule in data structure 208, the publisher 106 can use the front-end interface for the CMS 110 to modify the font size from eight to twelve. As a result, when a user subsequently accesses the content page 220, the CMS 110 provides an embeddable display element for the third party content block 224-B, which corresponds to the top block rule, with content formatted according to the updated rule.

In some implementations, the CMS 110 provides a front-end interface that allows publishers 106 to monitor the user activity with respect to particular third party content blocks on the content page 220. As used in this specification, user activity refers to any interaction between a user and a third party content block. Examples of user activity include user clicks or finger touches on the third party content block and viewing times of the third party content block. In response to the user activity, publishers 106 can modify the set of style parameters for the rule corresponding to the particular third party content block (as described above). For example, if the user activity is not as high as the publisher 106 expected, the publisher 106 may alter the style parameters to evaluate if that affects the user activity. Thus, when a user subsequently accesses the content page 220, the CMS 110 formats the third party content according to the updated style parameters and then presents this formatted content in an embeddable display element corresponding to the particular third party content block that is provided to the user device 102. In this way, the publisher 106 can quickly modify styles for particular content blocks and discern the impact of user activity based on such modifications. This allows the publisher to tailor the styling of content blocks to maximize the user activity for that block.

In some implementations, the CMS 110 can facilitate migration of the style parameters specified within a legacy content page to rules and corresponding style parameters stored by the CMS 110, as described in this specification. Conventionally, content pages include one or more styles included within the code for these pages, e.g., as JavaScript® parameters reflecting various style parameters (e.g., size, font, color, number of ads, display format, etc.). For such pages, the CMS 110 requests this embedded code within the page, which is collected and provided to the CMS 110 from a script executing on this content page. The CMS 110 parses this code to identify the style parameters and the corresponding third party content blocks that each set of style parameters relates to in the code. For example, the CMS 110 may identify portions of the code that correspond to particular third party content blocks by searching for the names of these blocks that may be provided with the request 202. For each piece of code corresponding to a particular content block, the CMS 110 searches for tags in the code that correspond to different known style parameters (e.g., font, color, size, table, etc.). The CMS 110 generates a separate rule for each set of style parameters associated with a particular content block. The CMS 110 stores each of these separate rules and the corresponding set of style parameters along with a style identifier for the content page 220.

The style identifier for the content page may already exist on the content page, in which case, it may be provided to CMS 110 along with the code (as described above). In some instances, the legacy content page may not include a style identifier. In such instances, the CMS 110 generates a style identifier for the content page and then provides this style identifier to the publisher 106 of the content page to include with the content page.

Figure 3:
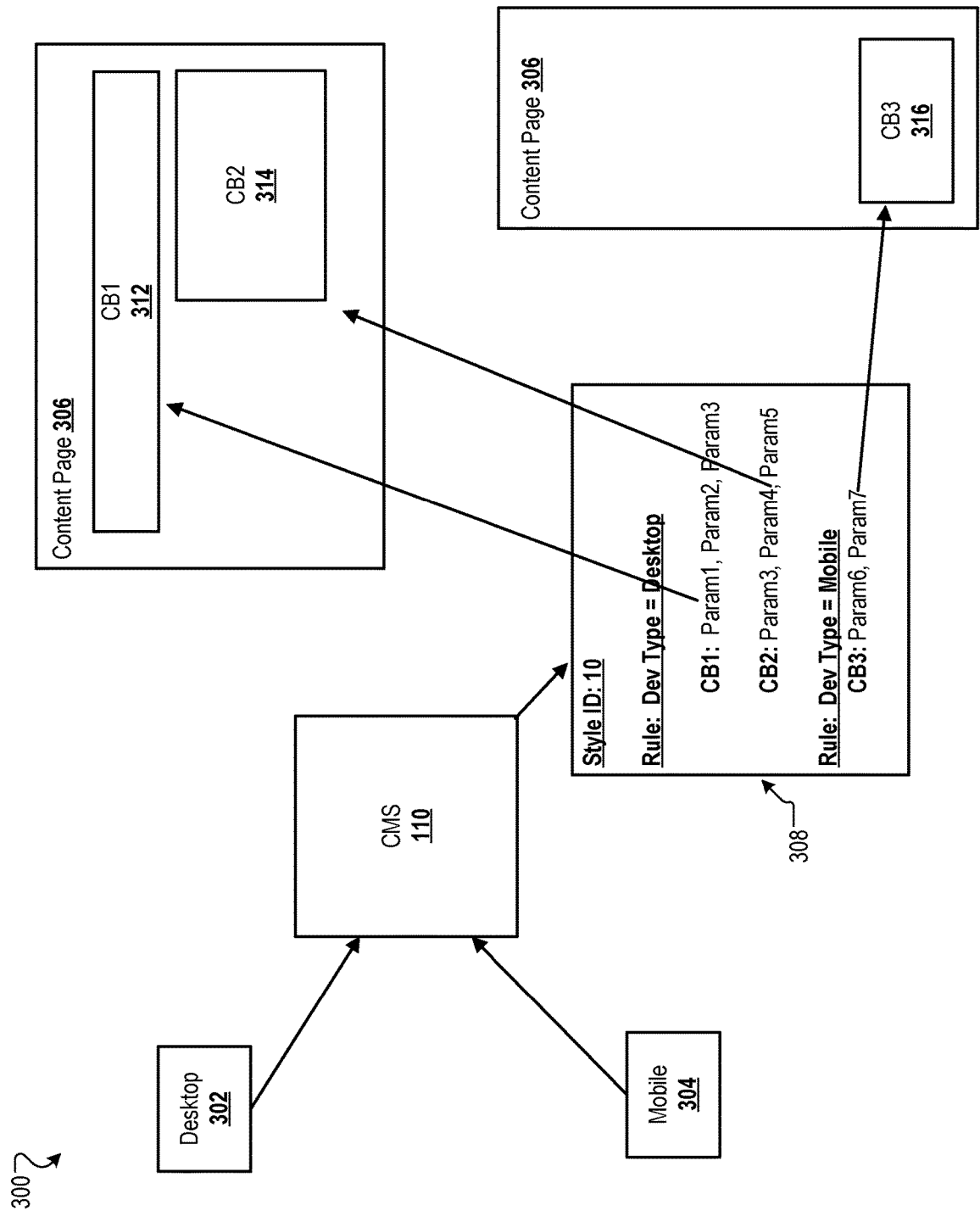
FIG. 3 is a block diagram illustrating the content management system formatting third party content items differently based on the context in which the content is presented and the rules specified by the publisher.

FIG. 3 is a block diagram that illustrates the CMS 110 formatting third party content items differently based on the context in which the content is presented and the rules specified by the publisher.

As shown in FIG. 3, the CMS 110 can receive a request for third party content (similar to the request 202 described above with reference to FIG. 2) from different types of users devices 102, such as desktop 302 and mobile 304. Each request for content is generated when the users of these respective devices access a content page 306, e.g., the same content page.

Each request also includes the style identifier of the content page that the user of the device is accessing, as well as attributes that define the context within which the requested third party content is to be presented (as described above with reference to FIG. 2). In the example block diagram of FIG. 3, the request from desktop 302 includes a style identifier of 10. The request from desktop 302 also includes attributes, such as, for example, a device type attribute specifying that the user is using a desktop device and third party content block names that specify the names of the content blocks on the page (CB1, CB2, CB3). Similarly, the request from mobile device 304 includes a style identifier of 10, i.e., the same style identifier that was received in the request from the desktop 302. The request from mobile device 304 also includes attributes, such as for example, a device type attribute specifying that the user is using a mobile device and third party content block names that specify the names of the content blocks on the page (CB1, CB2, CB3).

As described above with reference to FIG. 2, the CMS selects third party content from content sources 104 in response to these requests.

The CMS 110 next determines the appropriate formatting for the selected third party content to be presented in the third party content blocks on the content page. The manner in which the appropriate style rules and their corresponding style parameters are selected is described in detail with reference to FIG. 2. For brevity, only a summary version of these operations is described below.

In the example block diagram of FIG. 3, the CMS 110 uses the style identifier of 10 included in each request to identify two rules—Mobile and Desktop—from data structure 308 that have been specified by a publisher 106 for the content page 306. Then, using the attribute specifying the third party content block names included in the request, the CMS 110 identifies, using data structure 308, the appropriate rules and corresponding style parameters.

With respect to the request from the desktop 302, the device type attribute is desktop and accordingly, the CMS 110 selects the desktop style rule shown in data structure

308. More specifically, the CMS 110 can compare the device type attribute in the request to each rule condition to determine which rule is applicable to the request. In the present example, the request from the desktop 302 specifies that the device type is "desktop," such that the device type in this request will satisfy the condition for the desktop rule, which requires that the device type=desktop, but will not satisfy the condition for the mobile rule, which requires that the device type=mobile.

The CMS 110 also uses the attribute specifying the names of the third party content blocks to identify the rules corresponding to these blocks to determine the specific styling parameters that will be applied. Using the names of the third party content blocks including in the request, the CMS 110 identifies the specific style rules for CB1 and CB2, which specify the style parameters for third party content blocks CB1 and CB2, respectively. The CMS 110 uses the style parameters (Param1, Param2, and Param3) for rule CB1 to format the third party content to be presented in third party content block CB1. Similarly, the CMS 110 uses the style parameters for rule CB2 (Param3, Param4, Param5) to format the third party content to be presented in third party content block CB2. Because none of the rules for desktop include any style rules for the third party content block CB3, the CMS 110 can format the content within this block using default style parameters that may be specified by the publisher 106. In some implementations, the default style parameter can be a null parameter, in which case, the CMS 110 does not present a CB3 block (as shown in FIG. 3). Alternatively, the default style parameters can include a set of standard style parameters, in which case the CMS 110 can format the third party content in the third party content block CB3 using these style parameters and then present this block with the formatted third party content on the content page 306.

With respect to the request from the mobile 304, the device type attribute is mobile and accordingly, the CMS 110 selects the mobile style rule shown in data structure 308 based on a match between the device type of "mobile" being specified in the request, and the condition for the mobile style rule requiring device type=mobile. The CMS 110 also uses the attribute specifying the names of the third party content blocks to identify the rules corresponding to these blocks. Using the names of the third party content blocks including in the request, the CMS 110 identifies the rule CB3, which specifies the style parameters for third party content block CB3. The CMS 110 uses the style parameters (Param6, Param7) for rule CB3 to format the third party content to be presented in third party content block CB3. Because none of the rules for mobile include any style rules for third party content block CB1 and CB2, the CMS 110 can format the content within these third party content blocks using a default style parameter that may be specified by the publisher 106. In some implementations, the default style parameter can be a null parameter, in which case, the CMS 110 does not present third party content blocks CB1 and CB2 (as shown in FIG. 3). Alternatively, the default style parameter can include a set of standard style parameters, in which case the CMS 110 can format the third party content in the third party content blocks CB1 and CB2 using these style parameters and then present these blocks with the formatted third party content on the content page 306.

As described above with reference to FIG. 2, the CMS 110 then provides these formatted third party content items for presentation within the appropriate third party content blocks on the respective devices (desktop 302 and mobile 304) from which the requests originated.

Figure 4:
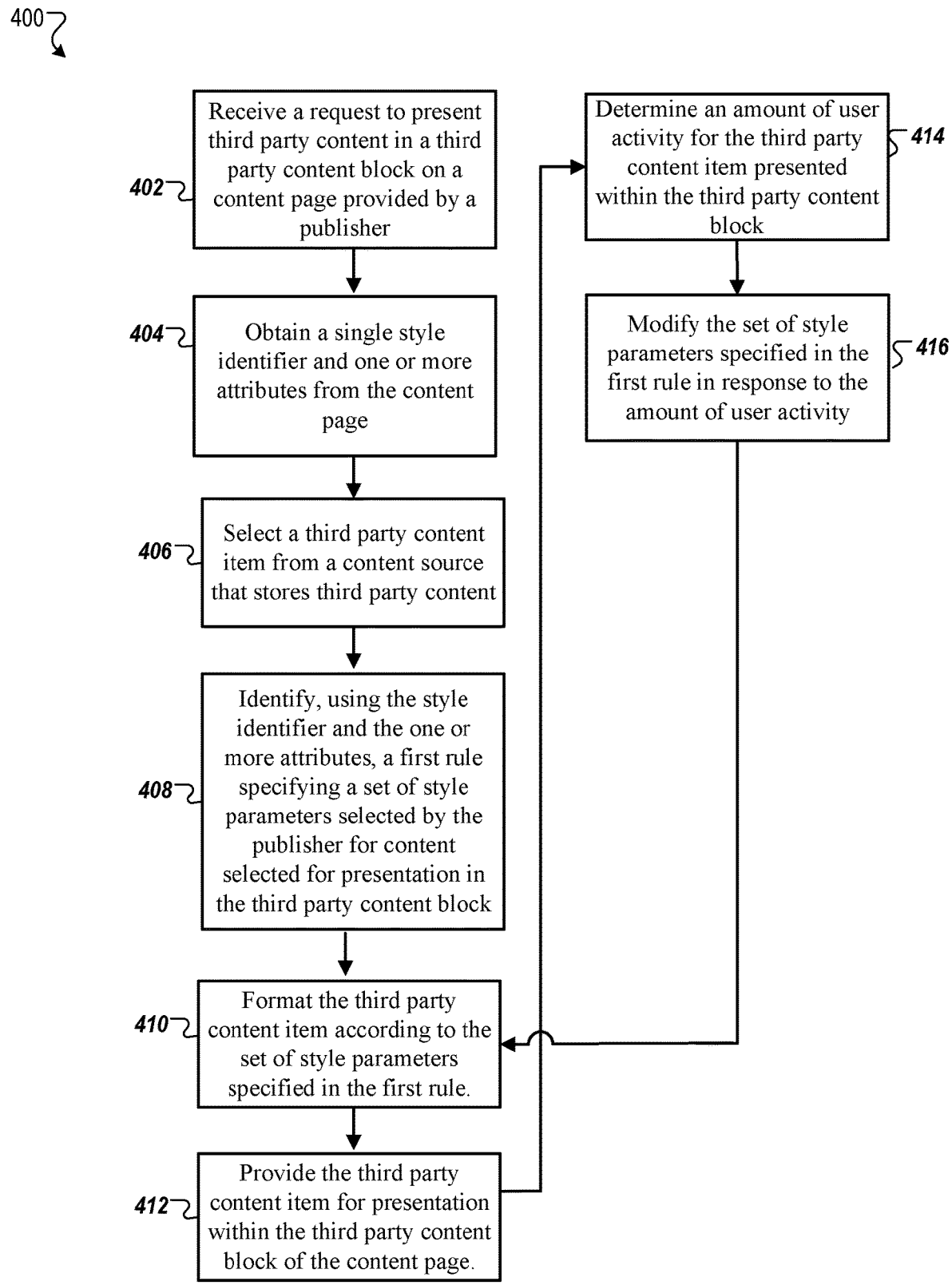
FIG. 4 is a flow diagram of an example process for formatting third party content items and presenting these items for presentation in third party content blocks on a publisher's content page.

FIG. 4 is a flow diagram of an example process 400 for formatting third party content items and presenting these items for presentation in third party content blocks on a publisher's content page. Operations of process 400 are described below as being performed by the components of the system described and depicted in FIGS. 1-3. Operations of the process 400 are described below for illustration purposes only. Operations of the process 400 can be performed by any appropriate device or system, e.g., any appropriate data processing apparatus. Operations of the process 400 can also be implemented as instructions stored on a non-transitory computer readable medium. Execution of the instructions cause one or more data processing apparatus to perform operations of the process 400.

The CMS 110 receives a request to present third party content in a third party content block on a content page provided by a publisher 106 (at 402). As described above with reference to FIGS. 2 and 3, the CMS 110 receives a request 202 for third party content for one or more third party content blocks on a publisher's content page accessed by a user on user device 102.

The CMS 110 obtains a single style identifier and one or more attributes from the content page (at 404). The single style identifier can be both explicitly declared—an alphanumeric string—or implicitly declared. As described above with reference to FIGS. 2 and 3, the request includes the single style identifier that is embedded in the content page (i.e., expressly declared) as well as one or more attributes from the content page that define the context within which the content is to be presented (e.g., device type, user agent type, screen size, etc.). In some implementations, a content page may not include a single style identifier and instead, the publisher may use another type of identifier that need not be included in the page (i.e., implicitly declared) to define different style rules and parameters. In such implementations, the CMS 110 can use another identifier that may be provided (e.g., a uniform resource locator (URL)) with the request and use this URL to identify the style rules and parameters corresponding to the URL, which serves as the single style identifier.

The CMS 110 selects a third party content item from a content source 104 that stores third party content (at 406), as described above with reference to FIG. 2.

The CMS 110 identifies, using the single style identifier and the one or more attributes, a first rule specifying a set of style parameters for content selected for presentation in the third party content block (at 408). As described above with reference to FIGS. 2 and 3, the CMS 110 uses the single style identifier to identify a set of style rules corresponding to a content page. Then, using the one or more attributes, the CMS 110 identifies a first rule that includes a set of style parameters for the content selected for presentation in the third party content block (as described above with reference to FIGS. 2 and 3).

The CMS 110 formats the third party content item according to the set of style parameters specified in the first rule (at 410), as described above with reference to FIGS. 2 and 3. Alternatively, and as described above with reference to FIG. 2, the user device 102, instead of the CMS 110, formats the third party content item according to the set of style parameters specified in the first rule The CMS 110 provides the third party content item for presentation within the third party content block of the content page (at 412). As described above with reference to FIG. 2, the CMS 110 provides for presentation an embeddable display element, including the formatted third party content item, within the appropriate third party content block on the content page. Alternatively, and as described above with reference to FIG. 2, the user device 102, instead of the CMS 110, formats and provides the third party content item for presentation within the third party content block of the content page.

The content management system 110 determines an amount of user activity for the third party content item presented within the third party content block (at 414). As described above with reference to FIG. 2, the CMS 110 maintains a count of all the user activity with respect to the formatted third party content item presented within the third party content block. The CMS 110 aggregates (i.e., sums up) the count of the user activity to determine the amount of user activity.

The content management system 110 modifies the set of style parameters specified in the first rule in response to the amount of user activity (at 416). As described above with reference to FIG. 2, if the amount of user activity is less than a threshold amount of user activity, the publisher 106 may select, using a front end interface of the CMS 110, a modified set of style parameters. The CMS 110 modifies the style parameters corresponding to the first rule based on the style parameters selected by the publisher 106.

The CMS 110 formats the third party content item according to the modified set of style parameters specified in the first rule in the same manner as described above with reference to operation 410 (and as further described with reference to FIGS. 2 and 3). The CMS 110 then provides this formatted third party content item for presentation within the third party content block of the content page (in the same manner as described above with reference to operation 412 and FIGS. 2 and 3).

As described above with respect to FIG. 2, the CMS 110 provides a pre-formatted embeddable display element for presentation on the content page 220. Alternatively, in some implementations, the CMS 110 may provide an unformatted, embeddable displayed element including the third party content item 206 to the user device 102. The CMS 110 can also use the style identifier corresponding to this content page to identify the appropriate rules and corresponding style parameters to the user device 102 (in the same manner as described above). The CMS 110 can provide this information to the user device 102. Thus, instead of the CMS 110, the user device 102 formats the received embeddable display element using one or more rules specified within the identified rules and then presents this element for display on the content page (in the same manner as described above with reference to the CMS 110). Alternatively, instead of the CMS 110 providing the set of rules and corresponding style parameters, the user device 102 may store a data structure that is similar to the data structure 208 stored by the CMS 110. In such implementations, the user device 102 receives the third party content item from the CMS 110 and then performs all the subsequent styling-based operations described above with reference to the CMS 110.

Figure 5:
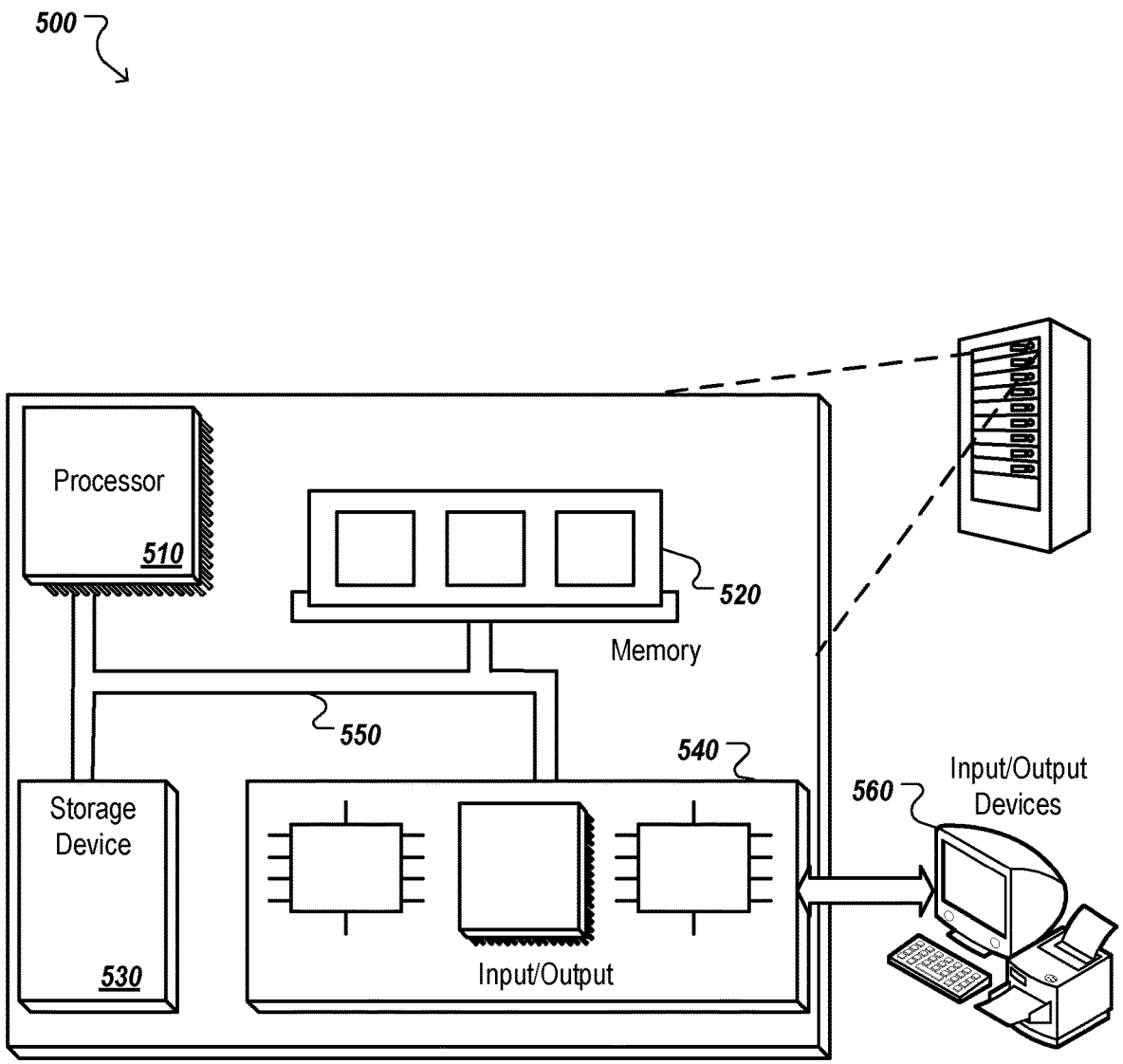
FIG. 5 is a block diagram of an example computer system.

FIG. 5 is block diagram of an example computer system 500 that can be used to perform operations described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In some implementations, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In some implementations, the memory 520 is a volatile memory unit. In another implementation, the memory 520 is a non-volatile memory unit.

The storage device 530 is capable of providing mass storage for the system 500. In some implementations, the storage device 530 is a computer-readable medium. In various different implementations, the storage device 530 can include, for example, a hard disk device, an optical disk device, a storage device that is shared over a network by multiple computing devices (e.g., a cloud storage device), or some other large capacity storage device.

The input/output device 540 provides input/output operations for the system 500. In some implementations, the input/output device 540 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
receiving a request to present third party content in a third party content block on a content page provided by a publisher, wherein the third party content is provided by an entity different from the publisher;
obtaining a single style identifier and one or more attributes from the content page, wherein the single style identifier is embedded in the content page and corresponds to a set of rules for formatting third party content provided for display on the content page, and the one or more attributes are descriptive of a context within which content on the content page is presented;
after receiving the request, selecting a third party content item from a content source that stores third party content;
identifying, using the single style identifier and the one or more attributes, a first rule specifying a set of style parameters selected for content selected for presentation in the third party content block from among a plurality of rules specifying different styles for a respective plurality of third party content blocks on the content page;
formatting the third party content item according to the set of style parameters specified in the first rule; and
providing the third party content item for presentation within the third party content block of the content page.

2. The computer implemented method of claim 1, wherein the one or more attributes include user agent, browser screen size, third party content block name, or device type.

3. The computer implemented method of claim 1, further comprising:
modifying the set of style parameters specified in the first rule; and
wherein formatting the third party content item according to the set of style parameters specified in the first rule, includes formatting the third party content item using the modified set of style parameters specified in the first rule in response to receipt of the single style identifier.

4. The computer implemented method of claim 1, further comprising:
determining an amount of user activity for the third party content item presented within the third party content block;
modifying the set of style parameters specified in the first rule in response to the amount of user activity;
formatting the third party content item using the modified set of style parameters specified in the first rule in response to receipt of the single style identifier; and
after formatting the third party content item using the modified set of style parameters, providing the third party content item for presentation within the third party content block of the content page.

5. The computer implemented method of claim 1, further comprising:
obtaining, from the content page, one or more sets of style parameters, wherein each set of style parameters specifies a manner in which content is to be formatted for presentation in one or more third party content blocks;
for each set of style parameters of the one or more style parameters, generating a rule including the set of style parameters; and
storing each generated rule as a rule for the single style identifier along with the plurality of rules.

6. The computer implemented method of claim 1, wherein the set of style parameters specified in the first rule are selected by the publisher.

7. The computer implemented method of claim 1, wherein the style parameters include at least a maximum number of characters, a font color, a font type, a font size, an orientation, or a border applicable to the third party content.

8. The computer implemented method of claim 1, wherein the third party content block comprises an embeddable display element embedded in the content page.

9. A system, comprising:
one or more memory devices storing instructions; and
one or more data processing apparatus that are configured to interact with the one or more memory devices, and upon execution of the instructions, perform operations including:
receiving a request to present third party content in a third party content block on a content page provided by a publisher, wherein the third party content is provided by an entity different from the publisher;
obtaining a single style identifier and one or more attributes from the content page, wherein the single style identifier is embedded in the content page and corresponds to a set of rules for formatting third party content provided for display on the content page, and the one or more attributes are descriptive of a context within which content on the content page is presented;
after receiving the request, selecting a third party content item from a content source that stores third party content;
identifying, using the single style identifier and the one or more attributes, a first rule specifying a set of style parameters selected for content selected for presentation in the third party content block from among a plurality of rules specifying different styles for a respective plurality of third party content blocks on the content page;
formatting the third party content item according to the set of style parameters specified in the first rule; and
providing the third party content item for presentation within the third party content block of the content page.

10. The system of claim 9, wherein the one or more attributes include user agent, browser screen size, third party content block name, or device type.

11. The system of claim 9, wherein the one or more data processing apparatus that are configured to interact with the one or more memory devices, and upon execution of the instructions, perform operations, further comprising:
  modifying the set of style parameters specified in the first rule; and
  wherein formatting the third party content item according to the set of style parameters specified in the first rule, includes formatting the third party content item using the modified set of style parameters specified in the first rule in response to receipt of the single style identifier.

12. The system of claim 9, wherein the one or more data processing apparatus that are configured to interact with the one or more memory devices, and upon execution of the instructions, perform operations, further comprising:
  determining an amount of user activity for the third party content item presented within the third party content block;
  modifying the set of style parameters specified in the first rule in response to the amount of user activity;
  formatting the third party content item using the modified set of style parameters specified in the first rule in response to receipt of the single style identifier; and
  after formatting the third party content item using the modified set of style parameters, providing the third party content item for presentation within the third party content block of the content page.

13. The system of claim 9, wherein the one or more data processing apparatus that are configured to interact with the one or more memory devices, and upon execution of the instructions, perform operations, further comprising:
  obtaining, from the content page, one or more sets of style parameters, wherein each set of style parameters specifies a manner in which content is to be formatted for presentation in one or more third party content blocks;
  for each set of style parameters of the one or more style parameters, generating a rule including the set of style parameters; and
  storing each generated rule as a rule for the single style identifier along with the plurality of rules.

14. The system of claim 9, wherein the set of style parameters specified in the first rule are selected by the publisher.

15. The system of claim 9, wherein the style parameters include at least a maximum number of characters, a font color, a font type, a font size, an orientation, or a border applicable to the third party content.

16. The system of claim 9, wherein the third party content block comprises an embeddable display element embedded in the content page.

17. A non-transitory computer readable medium storing instructions that, when executed by one or more data processing apparatus, cause the one or more data processing apparatus to perform operations comprising:
  receiving a request to present third party content in a third party content block on a content page provided by a publisher, wherein the third party content is provided by an entity different from the publisher;
  obtaining a single style identifier and one or more attributes from the content page, wherein the single style identifier is embedded in the content page and corresponds to a set of rules for formatting third party content provided for display on the content page, and the one or more attributes are descriptive of a context within which content on the content page is presented;
  after receiving the request, selecting a third party content item from a content source that stores third party content;
  identifying, using the single style identifier and the one or more attributes, a first rule specifying a set of style parameters selected for content selected for presentation in the third party content block from among a plurality of rules specifying different styles for a respective plurality of third party content blocks on the content page;
  formatting the third party content item according to the set of style parameters specified in the first rule; and
  providing the third party content item for presentation within the third party content block of the content page.

18. The non-transitory computer readable medium of claim 17, wherein the one or more attributes include user agent, browser screen size, third party content block name, or device type.

19. The non-transitory computer readable medium of claim 17, wherein the instructions, when executed by one or more data processing apparatus, cause the one or more data processing apparatus to perform operations comprising:
  modifying the set of style parameters specified in the first rule; and
  wherein formatting the third party content item according to the set of style parameters specified in the first rule, includes formatting the third party content item using the modified set of style parameters specified in the first rule in response to receipt of the single style identifier.

20. The non-transitory computer readable medium of claim 17, wherein the instructions, when executed by one or more data processing apparatus, cause the one or more data processing apparatus to perform operations:
  determining an amount of user activity for the third party content item presented within the third party content block;
  modifying the set of style parameters specified in the first rule in response to the amount of user activity;
  formatting the third party content item using the modified set of style parameters specified in the first rule in response to receipt of the single style identifier; and
  after formatting the third party content item using the modified set of style parameters, providing the third party content item for presentation within the third party content block of the content page.

21. The non-transitory computer readable medium of claim 17, wherein the instructions, when executed by one or more data processing apparatus, cause the one or more data processing apparatus to perform operations comprising:
  obtaining, from the content page, one or more sets of style parameters, wherein each set of style parameters specifies a manner in which content is to be formatted for presentation in one or more third party content blocks;
  for each set of style parameters of the one or more style parameters, generating a rule including the set of style parameters; and
  storing each generated rule as a rule for the single style identifier along with the plurality of rules.

22. The non-transitory computer readable medium of claim 17, wherein the set of style parameters specified in the first rule are selected by the publisher.

23. The non-transitory computer readable medium of claim 17, wherein the style parameters include at least a maximum number of characters, a font color, a font type, a font size, an orientation, or a border applicable to the third party content.

24. The non-transitory computer readable medium of claim 17, wherein the third party content block comprises an embeddable display element embedded in the content page.

* * * * *